United States Patent
Hua et al.

(10) Patent No.: US 12,353,302 B1
(45) Date of Patent: Jul. 8, 2025

(54) GROWING AND SPLITTING RAID CLUSTERS WITH WIDE DISTRIBUTION AND ASSIGNMENT OF SPARE CAPACITY FOR FAST PARALLEL DATA RECOVERY

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/585,131

(22) Filed: Feb. 23, 2024

(51) Int. Cl.
G06F 11/16 (2006.01)

(52) U.S. Cl.
CPC ...... G06F 11/1666 (2013.01); G06F 11/1658 (2013.01)

(58) Field of Classification Search
CPC .......................... G06F 11/1666; G06F 11/1658
See application file for complete search history.

(56) References Cited

U.S. PATENT DOCUMENTS

| | | | |
|---|---|---|---|
| 10,817,502 B2 * | 10/2020 | Talagala | G06F 12/0804 |
| 11,314,608 B1 | 4/2022 | Hua et al. | |
| 2010/0146206 A1 * | 6/2010 | Yochai | G06F 11/2092 |
| | | | 709/213 |
| 2010/0153638 A1 * | 6/2010 | Yochai | G06F 11/1464 |
| | | | 711/E12.019 |
| 2010/0153639 A1 * | 6/2010 | Corry | G06F 11/2028 |
| | | | 711/E12.019 |
| 2021/0318818 A1 * | 10/2021 | Lathrop | G06F 3/0604 |
| 2021/0382642 A1 * | 12/2021 | Hua | G06F 3/0644 |
| 2021/0389896 A1 * | 12/2021 | Gao | G11B 20/1816 |
| 2022/0066658 A1 * | 3/2022 | Hua | G06F 3/0644 |
| 2022/0107871 A1 * | 4/2022 | Hua | G06F 3/0619 |
| 2022/0237093 A1 * | 7/2022 | Hua | G06F 3/0644 |
| 2023/0027532 A1 * | 1/2023 | Hua | G06F 3/0646 |
| 2024/0028212 A1 * | 1/2024 | Hua | G06F 11/1076 |
| 2025/0147908 A1 * | 5/2025 | Doddaiah | G06F 15/82 |
| 2025/0156286 A1 * | 5/2025 | Lee | G06F 11/2094 |

* cited by examiner

*Primary Examiner* — Matthew M Kim
*Assistant Examiner* — Indranil Chowdhury
(74) *Attorney, Agent, or Firm* — Anderson Gorecki LLP

(57) ABSTRACT

A minimal cluster of W+1 drives for RAID width W includes at least 2*W same-size sequentially indexed cells on each drive. More specifically, each drive is organized into W*(LCM of 2, 3, ... N, N+1) same-size cells, where N is a predetermined number to support even distribution of spares over the first N cluster splits. Spare cells of aggregate capacity equivalent to a single drive are distributed such that there are W spare cells in each W-cell-wide submatrix. In the first cell index of each of the submatrices, a protection group is created in sequentially indexed drives starting with the lowest indexed drive. Also in each submatrix, W spare cells and (W−1) additional protection groups are distributed in cell-index-wise consecutive runs of a spare cell followed by sequentially ordered members of the additional protection groups. Spare capacity is widely distributed by adding drives to the cluster, creating spare cells, splitting the cluster into first and second clusters, and distributing the spare cells across W drives in each of the first and second clusters.

20 Claims, 15 Drawing Sheets

| disk\cell | 1 | 2 | 3 | 4 | 5 | 6 | 7 | 8 | 9 | 10 |
|---|---|---|---|---|---|---|---|---|---|---|
| 1 | a1 | b1 | c1 | d1 | e1 | a2 | b2 | c2 | d2 | e2 |
| 2 | a1 | c1 | d1 | e1 |    | a2 | c2 | d2 | e2 |    |
| 3 | a1 | d1 | e1 |    | b1 | a2 | d2 | e2 |    | b2 |
| 4 | a1 | e1 |    | b1 | c1 | a2 | e2 |    | b2 | c2 |
| 5 | a1 |    | b1 | c1 | d1 | a2 |    | b2 | c2 | d2 |
| 6 |    | b1 | c1 | d1 | e1 |    | b2 | c2 | d2 | e2 |

Figure 3

| disk\cell | 1 | 2 | 3 | 4 | 5 | 6 | 7 | 8 | 9 | 10 |
|---|---|---|---|---|---|---|---|---|---|---|
| 1 | a1 | b1 | c1 | d1 | e1 | a2 | b2 | c2 | d2 | e2 |
| 2 | a1 | c1 | d1 | e1 |   | a2 | c2 | d2 | e2 |   |
| 3 | a1 | d1 | e1 |   | b1 | a2 | d2 | e2 |   | b2 |
| 4 | a1 | e1 |   | b1 | c1 | a2 | e2 |   | b2 | c2 |
| 5 | a1 |   | b1 | c1 | d1 | a2 |   | b2 | c2 | d2 |
| 6 |   | b1 | c1 | d1 | e1 |   | b2 | c2 | d2 | e2 |
| 7 | b1 | c1 | d1 | e1 |   | b2 | c2 | d2 | e2 |   |

Figure 4

| disk\cell | 1 | 2 | 3 | 4 | 5 | 6 | 7 | 8 | 9 | 10 |
|---|---|---|---|---|---|---|---|---|---|---|
| 1 | a1 | f1 | c1 | d1 | e1 | a2 | f2 | c2 | d2 | e2 |
| 2 | a1 | f1 | d1 | e1 |    | a2 | f2 | d2 | e2 |    |
| 3 | a1 | f1 | e1 |    | b1 | a2 | f2 | e2 |    | b2 |
| 4 | a1 | f1 |    | b1 | c1 | a2 | f2 |    | b2 | c2 |
| 5 | a1 |    | b1 | c1 | d1 | a2 |    | b2 | c2 | d2 |
| 6 |    | b1 | c1 | d1 | e1 |    | b2 | c2 | d2 | e2 |
| 7 | b1 | c1 | d1 | e1 | f1 | b2 | c2 | d2 | e2 | f2 |

Figure 5

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 |  | a2 | f2 | g2 | h2 |  |
| 3 | a1 | f1 | g1 |  | i1 | a2 | f2 | g2 |  | i2 |
| 4 | a1 | f1 |  | h1 | i1 | a2 | f2 |  | h2 | i2 |
| 5 | a1 |  | g1 | h1 | i1 | a2 |  | g2 | h2 | i2 |
| 6 |  | b1 | c1 | d1 | e1 |  | b2 | c2 | d2 | e2 |
| 7 | b1 | c1 | d1 | e1 | f1 | b2 | c2 | d2 | e2 | f2 |
| 8 | c1 | d1 | e1 | g1 | b1 | c2 | d2 | e2 | g2 | b2 |
| 9 | d1 | e1 | h1 | b1 | c1 | d2 | e2 | h2 | b2 | c2 |
| 10 | e1 | i1 | b1 | c1 | d1 | e2 | i2 | b2 | c2 | d2 |

Figure 6

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 |    | a2 | f2 | g2 | h2 |    |
| 3 | a1 | f1 | g1 |    | i1 | a2 | f2 | g2 |    | i2 |
| 4 | a1 | f1 |    | h1 | i1 | a2 | f2 |    | h2 | i2 |
| 5 | a1 |    | g1 | h1 | i1 | a2 |    | g2 | h2 | i2 |
| 6 |    | b1 | c1 | d1 | e1 |    | b2 | c2 | d2 | e2 |
| 7 | b1 | c1 | d1 | e1 | f1 | b2 | c2 | d2 | e2 | f2 |
| 8 | c1 | d1 | e1 | g1 | b1 | c2 | d2 | e2 | g2 | b2 |
| 9 | d1 | e1 | h1 | b1 | c1 | d2 | e2 | h2 | b2 | c2 |
| 10 | e1 | i1 | b1 | c1 | d1 | e2 | i2 | b2 | c2 | d2 |
| 11 |    | b1 | c1 | d1 | e1 |    | b2 | c2 | d2 | e2 |

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 |    | a2 | f2 | g2 | h2 |    |
| 3 | a1 | f1 | g1 |    | i1 | a2 | f2 | g2 |    | i2 |
| 4 | a1 | f1 |    | h1 | i1 | a2 | f2 |    | h2 | i2 |
| 5 | a1 |    | g1 | h1 | i1 | a2 |    | g2 | h2 | i2 |
| 6 |    | b1 | c1 | d1 | e1 |    | b2 | c2 | d2 | e2 |
| 7 | j1 | c1 | d1 | e1 | f1 | j2 | c2 | d2 | e2 | f2 |
| 8 | j1 | d1 | e1 | g1 | b1 | j2 | d2 | e2 | g2 | b2 |
| 9 | j1 | e1 | h1 | b1 | c1 | j2 | e2 | h2 | b2 | c2 |
| 10 | j1 | i1 | b1 | c1 | d1 | j2 | i2 | b2 | c2 | d2 |
| 11 | j1 | b1 | c1 | d1 | e1 | j2 | b2 | c2 | d2 | e2 |

Figure 7

| disk\cell | 1 | 2 | 3 | 4 | 5 | 6 | 7 | 8 | 9 | 10 |
|---|---|---|---|---|---|---|---|---|---|---|
| 1 |  | a1 | f1 | g1 | h1 | i1 | a2 | f2 | g2 | h2 | i2 |
| 2 |  | a1 | f1 | g1 | h1 |  | a2 | f2 | g2 | h2 |  |
| 3 |  | a1 | f1 | g1 |  | i1 | a2 | f2 | g2 |  | i2 |
| 4 |  | a1 | f1 |  | h1 | i1 | a2 | f2 |  | h2 | i2 |
| 5 |  | a1 |  | g1 | h1 | i1 | a2 |  | g2 | h2 | i2 |
| 6 |  |  | b1 | c1 | d1 | e1 |  | b2 | c2 | d2 | e2 |
| 7 |  | j1 | c1 | d1 | e1 | f1 | j2 | c2 | d2 | e2 | f2 |
| 8 |  | j1 | d1 | e1 | g1 | b1 | j2 | d2 | e2 | g2 | b2 |
| 9 |  | j1 | e1 | h1 | b1 | c1 | j2 | e2 | h2 | b2 | c2 |
| 10 |  | j1 | i1 | b1 | c1 | d1 | j2 | i2 | b2 | c2 | d2 |
| 11 |  | j1 | b1 | c1 | d1 | e1 | j2 | b2 | c2 | d2 | e2 |
| 12 |  |  | f1 | g1 | h1 | i1 |  | f2 | g2 | h2 | i2 |

Figure 8

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 |    | a2 | f2 | g2 | h2 |    |
| 3 | a1 | f1 | g1 |    | i1 | a2 | f2 | g2 |    | i2 |
| 4 | a1 | f1 |    | h1 | i1 | a2 | f2 |    | h2 | i2 |
| 5 | a1 |    | g1 | h1 | i1 | a2 |    | g2 | h2 | i2 |
| 12|    | f1 | g1 | h1 | i1 |    | f2 | g2 | h2 | i2 |

| disk\cell | 1 | 2 | 3 | 4 | 5 | 6 | 7 | 8 | 9 | 10 |
|---|---|---|---|---|---|---|---|---|---|---|
| 11 | j1 | b1 | c1 | d1 | e1 | j2 | b2 | c2 | d2 | e2 |
| 7  | j1 | c1 | d1 | e1 |    | j2 | c2 | d2 | e2 |    |
| 8  | j1 | d1 | e1 |    | b1 | j2 | d2 | e2 |    | b2 |
| 9  | j1 | e1 |    | b1 | c1 | j2 | e2 |    | b2 | c2 |
| 10 | j1 |    | b1 | c1 | d1 | j2 |    | b2 | c2 | d2 |
| 6  |    | b1 | c1 | d1 | e1 |    | b2 | c2 | d2 | e2 |

Figure 9

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 |  | a2 | f2 | g2 | h2 | k2 |
| 3 | a1 | f1 | g1 |  | i1 | a2 | f2 | g2 | k2 | i2 |
| 4 | a1 | f1 |  | h1 | i1 | a2 | f2 | k2 | h2 | i2 |
| 5 | a1 |  | g1 | h1 | i1 | a2 | k2 | g2 | h2 | i2 |
| 6 |  | f1 | g1 | h1 | i1 | k2 | f2 | g2 | h2 | i2 |

| disk\cell | 1 | 2 | 3 | 4 | 5 | 6 | 7 | 8 | 9 | 10 |
|---|---|---|---|---|---|---|---|---|---|---|
| 1 | j1 | b1 | c1 | d1 | e1 | j2 | b2 | c2 | d2 | e2 |
| 2 | j1 | c1 | d1 | e1 | k1 | j2 | c2 | d2 | e2 |  |
| 3 | j1 | d1 | e1 | k1 | b1 | j2 | d2 | e2 |  | b2 |
| 4 | j1 | e1 | k1 | b1 | c1 | j2 | e2 |  | b2 | c2 |
| 5 | j1 | k1 | b1 | c1 | d1 | j2 |  | b2 | c2 | d2 |
| 6 | k1 | b1 | c1 | d1 | e1 |  | b2 | c2 | d2 | e2 |

Figure 10

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 | i1 | a2 | f2 | g2 | h2 | k2 |
| 3 | a1 | f1 | g1 | h1 | i1 | a2 | f2 | g2 | k2 | i2 |
| 4 | a1 | f1 |    | h1 | i1 | a2 | f2 | k2 | h2 | i2 |
| 5 | a1 | f1 | g1 | h1 | i1 | a2 | k2 | g2 | h2 | i2 |
| 6 | a1 | f1 | g1 | h1 | i1 | k2 | f2 | g2 | h2 | i2 |

| disk\cell | 1 | 2 | 3 | 4 | 5 | 6 | 7 | 8 | 9 | 10 |
|---|---|---|---|---|---|---|---|---|---|---|
| 1 | j1 | b1 | c1 | d1 | e1 | j2 | b2 | c2 | d2 | e2 |
| 2 | j1 | c1 | d1 | e1 | k1 | j2 | c2 | d2 | e2 | i2 |
| 3 | j1 | d1 | e1 | k1 | b1 | j2 | d2 | e2 | h2 | b2 |
| 4 | j1 | e1 | k1 | b1 | c1 | j2 | e2 | k2 | b2 | c2 |
| 5 | j1 | k1 | b1 | c1 | d1 | j2 | f2 | b2 | c2 | d2 |
| 6 | k1 | b1 | c1 | d1 | e1 | a2 | b2 | c2 | d2 | e2 |

Figure 11

| disk\cell | 1 | 2 | 3 | 4 | 5 | 6 | 7 | 8 | 9 | 10 |
|---|---|---|---|---|---|---|---|---|---|---|
| 1 | a1 | f1 | g1 | h1 | i1 | a2 | f2 | g2 | h2 | i2 |
| 2 | a1 | f1 | g1 | h1 | c1 | a2 | f2 | g2 | h2 | k2 |
| 3 | a1 | f1 | g1 | b1 | i1 | a2 | f2 | g2 | k2 | i2 |
| 4 | a1 | f1 | k1 | h1 | i1 | a2 | f2 | k2 | h2 | i2 |
| 5 | a1 | e1 | g1 | h1 | i1 | a2 | k2 | g2 | h2 | i2 |
| 6 | j1 | f1 | g1 | h1 | i1 | k2 | f2 | g2 | h2 | i2 |

| disk\cell | 1 | 2 | 3 | 4 | 5 | 6 | 7 | 8 | 9 | 10 |
|---|---|---|---|---|---|---|---|---|---|---|
| 1 | j1 | b1 | c1 | d1 | e1 | j2 | b2 | c2 | d2 | e2 |
| 2 | j1 | c1 | d1 | e1 | k1 | j2 | c2 | d2 | e2 | b2 |
| 3 | j1 | d1 | e1 | k1 | b1 | j2 | d2 | e2 | c2 | b2 |
| 4 | j1 | e1 | k1 | b1 | c1 | j2 | e2 |  | b2 | c2 |
| 5 | j1 | k1 | b1 | c1 | d1 | j2 | e2 | b2 | c2 | d2 |
| 6 | k1 | b1 | c1 | d1 | e1 | j2 | b2 | c2 | d2 | e2 |

Figure 12

GROWING AND SPLITTING RAID CLUSTERS WITH WIDE DISTRIBUTION AND ASSIGNMENT OF SPARE CAPACITY FOR FAST PARALLEL DATA RECOVERY

TECHNICAL FIELD

The subject matter of this disclosure is generally related to electronic data storage.

BACKGROUND

Redundant Array of Independent Drives (RAID) protection groups help to avoid data loss in electronic data storage systems by enabling reconstruction of a failed protection group member using the remaining members. Individual disk drives are organized into a plurality of same-size cells (also known as splits or partitions), each of which is either used for storing a protection group member or reserved as spare capacity for rebuilding a failed protection group member. A RAID-L (D+P) protection group has D data members and P parity members that define a width W=(D+P). For example, RAID-5 (4+1) is characterized by D=4, P=1, and W=5. The data members store data. The parity members store parity information such as XORs of the data values. The parity information enables reconstruction of the data in the event that a data member fails. The data members enable reconstruction of the parity information in the event that a parity member fails. W spare cells with aggregate storage capacity equivalent to one drive may be created and distributed on across drives in a drive cluster for rebuilding RAID members after a drive failure. The cluster of drives may be scaled-up in single drive increments and split into two clusters of W and (W+1) drives, respectively, with separate RAID groups when the cluster grows to (2*W)+1 drives, after which all the spare capacity is located in the cluster of (W+1) drives.

SUMMARY

A method in accordance with some implementations comprises: creating, for a protection group width W, a drive cluster of W+1 sequentially indexed drives; creating at least 2*W same-size sequentially indexed cells in each of the drives; creating submatrices of W cells; creating, in a first cell index of each of the submatrices, a protection group in sequentially indexed drives starting with a lowest indexed drive; in each submatrix, creating W spare cells and (W−1) additional protection groups distributed in cell-index-wise consecutive runs of a spare cell followed by sequentially ordered members of the additional protection groups; and widely distributing spare capacity by adding drives to the cluster, creating spare cells, splitting the cluster into first and second clusters, and distributing the spare cells across W drives in each of the first and second clusters.

An apparatus in accordance with some implementations comprises: a plurality of non-volatile drives; a plurality of interconnected compute nodes that manage access to the drives; and a drive manager configured to: create, for a protection group width W, a drive cluster of W+1 sequentially indexed drives; create at least 2*W same-size sequentially indexed cells in each of the drives; create submatrices of W cells; create, in a first cell index of each of the submatrices, a protection group in sequentially indexed drives starting with a lowest indexed drive; in each submatrix, create W spare cells and (W−1) additional protection groups distributed in cell-index-wise consecutive runs of a spare cell followed by sequentially ordered members of the additional protection groups; and widely distribute spare capacity by adding drives to the cluster, creating spare cells, splitting the cluster into first and second clusters, and distributing the spare cells across W drives in each of the first and second clusters.

In accordance with some implementations, a computer-readable storage medium stores instructions that when executed by a computer cause the computer to perform a method for using a computer system to create and distribute spare capacity on a scalable drive subset on which protection groups are maintained, the method comprising: creating, for a protection group width W, a drive cluster of W+1 sequentially indexed drives; creating at least 2*W same-size sequentially indexed cells in each of the drives; creating submatrices of W cells; creating, in a first cell index of each of the submatrices, a protection group in sequentially indexed drives starting with a lowest indexed drive; in each submatrix, creating W spare cells and (W−1) additional protection groups distributed in cell-index-wise consecutive runs of a spare cell followed by sequentially ordered members of the additional protection groups; and widely distributing spare capacity by adding drives to the cluster, creating spare cells, splitting the cluster into first and second clusters, and distributing the spare cells across W drives in each of the first and second clusters.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 3 illustrates creation of an initial drive cluster of (W+1) drives on which RAID (D+P) protections groups and spares are maintained.

FIGS. 4 through 7 illustrate adding disks to the cluster.

FIGS. 8 through 10 illustrate splitting the cluster.

FIGS. 11 and 12 illustrate assignment of spare cells.

DETAILED DESCRIPTION

U.S. patent Ser. No. 11/314,608 titled CREATING AND DISTRIBUTING SPARE CAPACITY OF A DISK ARRAY is incorporated by reference.

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines, including, but not limited to, compute nodes, computers, computing nodes, and servers, and processes are therefore enabled and within the scope of the disclosure.

Figure 1:
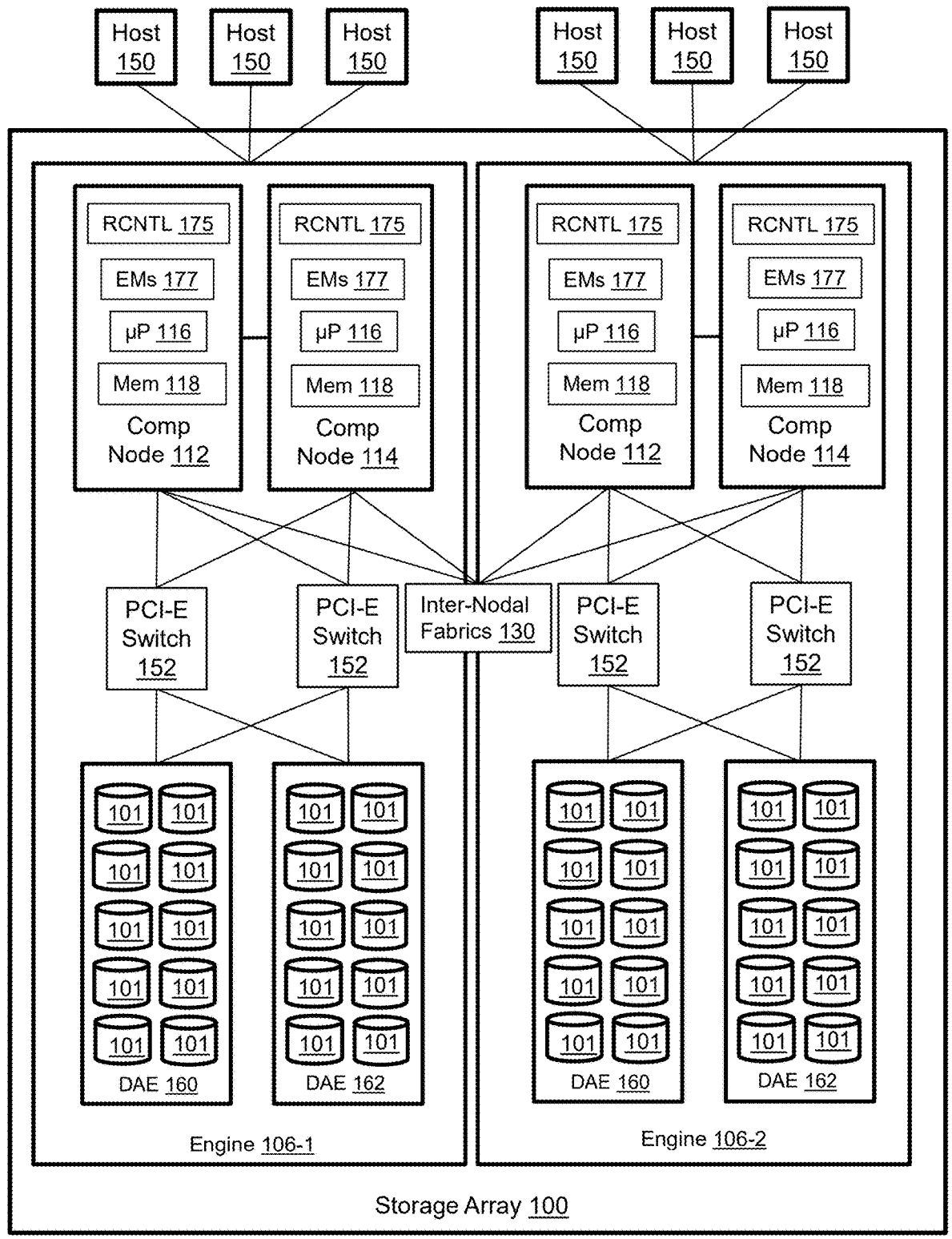
FIG. 1 illustrates a storage array with RAID controllers configured to create and widely distribute spare capacity associated with scalable drive clusters on which protection groups are maintained.

FIG. 1 illustrates a storage array 100 with RAID controllers 175 configured to create and widely distribute spare storage capacity associated with scalable drive clusters on which protection groups are implemented. The illustrated storage array includes two engines 106-1, 106-2. However, the storage array might include any number of engines. Each engine includes disk array enclosures (DAEs) 160, 162 and a pair of peripheral component interconnect express (PCI-e) interconnected compute nodes 112, 114 (also known as storage directors) in a failover relationship. Within each engine, the compute nodes and DAEs are interconnected via redundant PCI-e switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Each compute node 112, 114 runs emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. RAID controllers 175 may include one or more of special purpose electronic components, logic, and computer program code loaded into memory 118 from the managed drives 101 and run on the processors 116.

Figure 2:
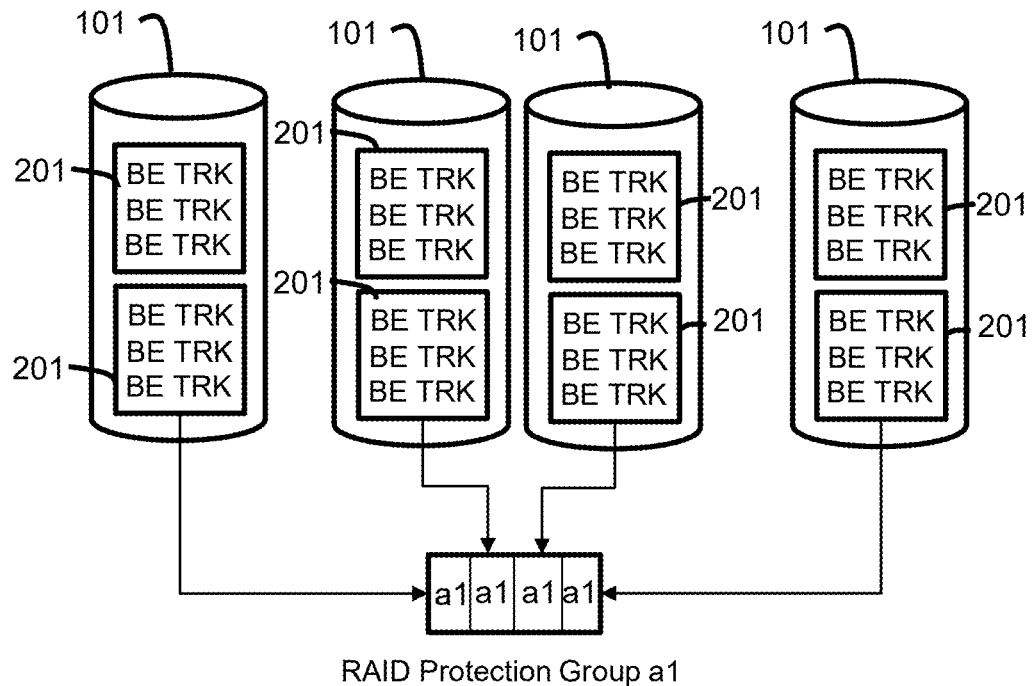
FIG. 2 illustrates layers of abstraction between the managed drives and the production storage object of the storage array of FIG. 1.
Figure 2:
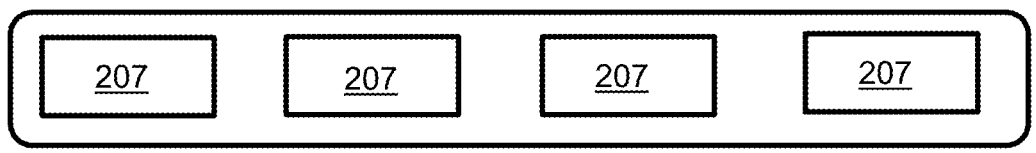
Figure 2:
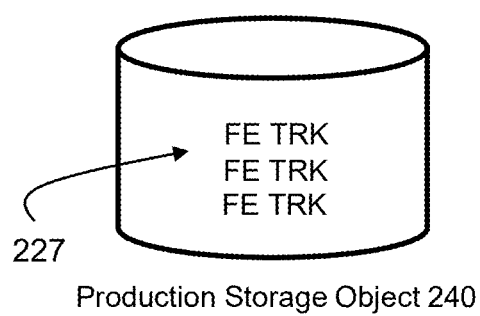

Referring to FIGS. 1 and 2, data that is created and used by instances of the host applications running on the host servers 150 is maintained on the managed drives 101. The managed drives are not discoverable by the host servers 150, so the storage array creates logical production storage objects such as production storage object 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on each of multiple ones of the managed drives 101. IO services emulations running on the processors of the compute nodes maintain metadata that maps between the LBAs of the production volume 240 and physical addresses on the managed drives 101 in order to process IOs from the host servers. Each production storage object is uniquely associated with a single host application. The storage array may maintain a plurality of production storage objects and simultaneously support multiple host applications.

The basic allocation unit of storage capacity that is used by the compute nodes 112, 114 to access the managed drives is a back-end track (BE TRK). The managed drives are organized into same-size units of storage capacity referred to herein as cells 201, each of which may contain multiple BE TRKs. Although individual drives can be configured as RAID group members, in the illustrated example a cell grouping containing cells 201 from different managed drives is used to create a RAID protection group a1, such as a RAID-5 (3+1) protection group, in which each member is referenced as a1. In order to be RAID-compliant, each member of a given protection group must be on a different managed drive. In the illustrated example, each cell 201 contains one member of protection group "a1" stored on a particular managed drive. Other protection groups, e.g., a2, b1, b2, c1, c2, d1, d2, and so forth, would be similarly formed. Storage resource pool 205 is a type of storage object that includes a collection of protection groups of the same RAID level. The host application data is logically stored in front-end tracks (FE TRKs) on production volume 240. The FE TRKs of the production volume are mapped to the BE TRKs on the managed drives and vice versa by tables and pointers that are maintained in the shared memory.

FIG. 3 illustrates creation of a minimal initial drive cluster of (W+1) managed drives on which RAID (D+P) protections groups are implemented and spares are distributed. The drive cluster is represented as a matrix of sequentially numbered disk rows and cell index columns. The storage array may initially include multiple drive clusters, each with either W or (W+1) drives. The initial minimal drive cluster for wide spare distribution has (W+1) drives and W*(LCM of 2, 3, . . . , N, N+1) same-size cells, where LCM is the Least Common Multiple and N is a predetermined number to support even distribution of spares over the first N cluster splits. The specifically illustrated example is a RAID-5 (4+1) with W+1 drives and N=1, so each drive is organized into 10 same-size cells that are indexed 1 through 10.

The drive matrix includes W-cell-wide submatrices that have the same pattern of distribution of protection group members and spare cells. Protection groups in the illustrated example are sequentially referenced with letters a, b, c, d, e, and numbers 1, 2, corresponding to the submatrix in which the protection group is located. In each submatrix, the first RAID group (a1 or a2) is in the first column (cell indices 1, 6). Members of the other RAID groups, in sequential order (b1-e1 or b2-e2) preceded by a spare cell are located in the next cells in column-wise consecutive runs. This configuration distributes the equivalent spare storage capacity of one disk drive across 2*W spare cells, diagonally within the representative matrix, with two spare cells on each of W drives. The distribution of the spare cells may be maintained as the cluster is scaled-up so that spare cell locations are easily predictable in the event of a disk failure.

FIGS. 4 through 7 illustrate adding disks to the minimal drive cluster. FIG. 4 shows the addition of a first new disk 7 to the cluster. RAID members are relocated to the new disk according to a rotation algorithm. In each rotation, a vertical column of the W lowest indexed previously unrotated cells, excluding the single cell index protection groups initially created in the lowest numbered cells of each submatrix, are rotated in order to a horizontal row of W cells on the new drive. In the illustrated example, RAID members at cell indices 2 and 7 of disks 1-5 are relocated to the new disk according to the rotation algorithm. Specifically, the W protection group members ordered b1, c1, d1, e1, spare and b2, c2, d2, e2, spare in the lowest numbered unrotated cells of each submatrix, excluding the single partition protection groups a1, a2 initially created in the lowest numbered cells, are rotated from the first W drives in ascending order to the W partitions of the new drive in ascending order. For example, the protection group member on the first drive is moved to the first cell of the new drive, the protection group member on the second drive is moved to the second cell of the new drive, the protection group member on the third drive is moved to the third cell of the new drive, and so forth. Consequently, the drive number from which the member is moved becomes the cell number to which the member is moved.

The cells that are vacated by rotation-relocation are used to create new RAID groups (f1 and f2) as shown in FIG. 5. The original locations of the distributed spare cells are maintained by "borrowing" one empty cell on the new disk for each new RAID group. Conceptually, the spare cells can be viewed as being either rotated/replaced or unrotated because they have no contents to relocate.

Referring to FIG. 6, as the drive cluster grows, unrotated RAID members at the next columns (cells 3-5 and 8-10 of disks 1-5) are relocated to new disks. New RAID groups (g1-i1, g2-i2) are created using the vacated cells after rotation-relocation. Borrowed cells (g1-i1, g2-i2) are on diagonals of new disks 7-10. The original distribution of the spare cells is maintained throughout scale-up of the drive cluster.

Referring to FIG. 7, there are no remaining rotatable cells on the original W+1 drives when addition of new drives results in there being 2*W+1 drives, so the drives indexed (W+2) through 2*W are used. In the illustrated example, addition of the 11$^{th}$ disk prompts the RAID members (b1-e1, b2-e2) at cells of columns 1 and 6 (disks 7-10) to be rotation-relocated to the new disk. New RAID groups j1 and j2 are created in the vacated cells.

FIGS. 8 through 10 illustrate splitting of the drive cluster. A split is prompted when addition of new drives results in there being 2*(W+1) drives in the cluster. Rotation-relocation is implemented before the split to prepare a second diagonal distribution of cells corresponding to the locations of spare cells. In the example illustrated in FIG. 8, adding the 12$^{th}$ disk prompts RAID members (f1-i1 and f2-i2) on the "borrowed" diagonal cells to be relocated to the new disk. The cluster (matrix) is then split.

Referring to FIG. 9, the drive cluster is split into two drive clusters while preserving the distribution of spares and creating new spares by adding the new disk to cluster of disks 1-W, swapping the first and last disks of the second cluster, and rotating the diagonal of protection group members in the second cluster to the new disk to create the predetermined diagonal distribution of spare cells. In the specifically illustrated example, disks 1-5 and disk 12 form the top cluster (matrix). Disks 6 and 11 are swapped and join disks 7-10 to form the bottom cluster (matrix), which may start a new cycle of cluster growth. The spare cells are now widely distributed to twice as many disks as before the split.

Referring to FIG. 10, each cluster split introduces a diagonal of empty cells that may be used for protection groups or spares. In the specifically illustrated example, RAID groups k1 and k2 are located in two of the diagonals of empty cells. The remaining spare cells are distributed over 10 disks for maximum parallelism and fast data recovery. The disks that were swapped or located out of sequential order for the cluster split are re-referenced along with the other disks such that the disk indices in the representative matrices are sequentially numbered, e.g., starting at 1.

FIGS. 11 and 12 illustrate assignment of spare cells during recovery from disk failure. Protection group members on a failed drive are recovered to spare cells at corresponding cell indices if possible. Otherwise, the protection group members in consecutive order are recovered to spare cells ordered by ascending disk indices. In the example shown in FIG. 11, disk 4 of the top cluster fails. Each affected RAID member is recovered at a spare cell with the same cell index as the affected RAID member because it is possible to do so. In the example shown in FIG. 12, disk 4 of the bottom cluster fails. Affected RAID members j1, e1, k1, b1, c1 are recovered to the spare cells with the same cell indices while members b2, c2, e2, j2 are recovered to spares at disks 2, 3, 5, 6. Spare cells assignment to RAID members follows the sorted orders.

Figure 13:
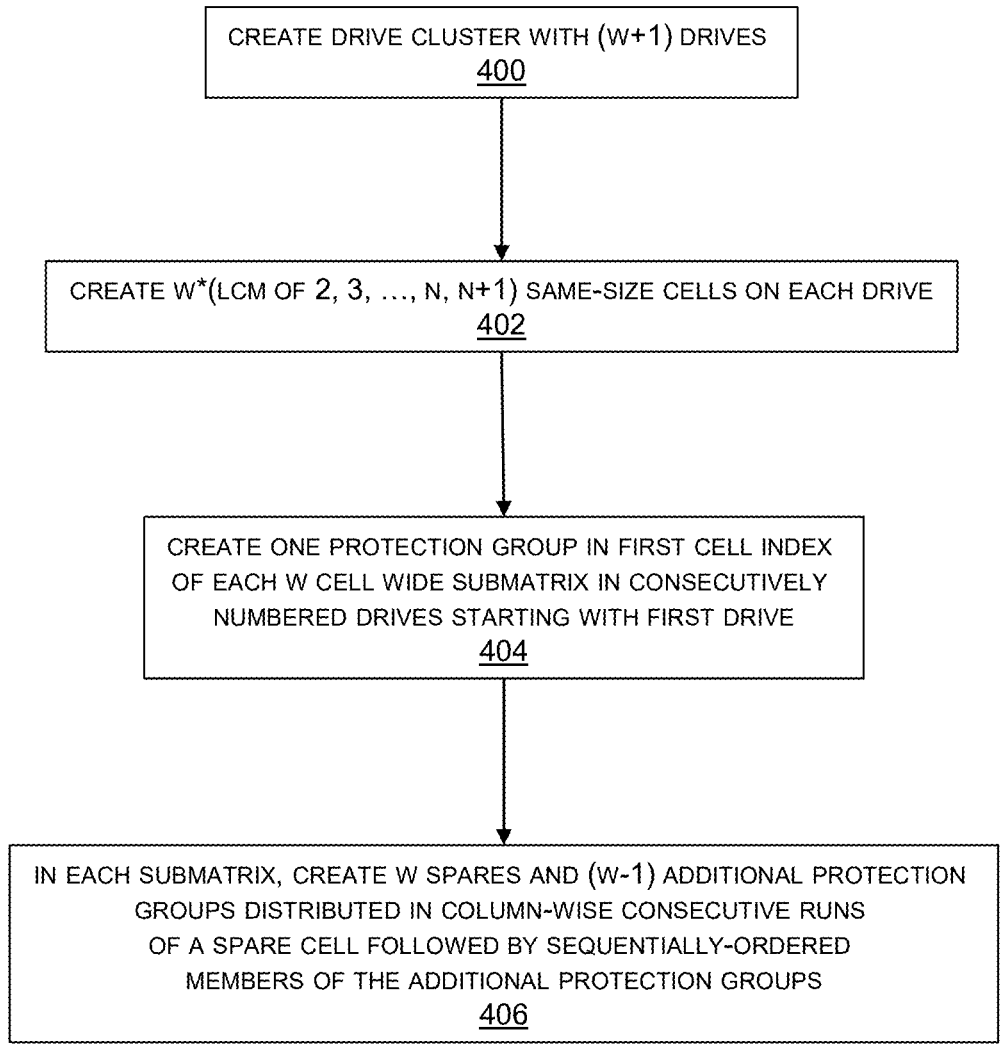
FIG. 13 illustrates a method for distributing protection group members and spare cells in a drive cluster.

FIG. 13 illustrates a method for distributing protection group members and spare cells in a minimal drive cluster. The cluster is created by selecting (W+1) drives as indicated in step 400. The drives are represented by a matrix in which the drives are sequentially numbered, e.g., 1 through W+1 drive rows. In step 402, each of the drives is organized into W*(LCM of 2, 3, . . . N, N+1) same-size cells, N is a predetermined number to support even distribution of spares over the first N cluster splits. At least one split is supported, so N≥1. The cells are sequentially indexed, e.g., cell columns in the representative matrix. Step 404 is creating one protection group in the first cell index of each W-cell-wide submatrix in consecutively numbered drives (rows) starting with the first drive. Step 406 is creating, in each submatrix, W spare cells and (W−1) additional protection groups distributed in column-wise consecutive runs. Each run may include a spare cell followed by a member of each of the additional protection groups in sequential order. The pattern is repeated until the submatrix is populated.

Figure 14:
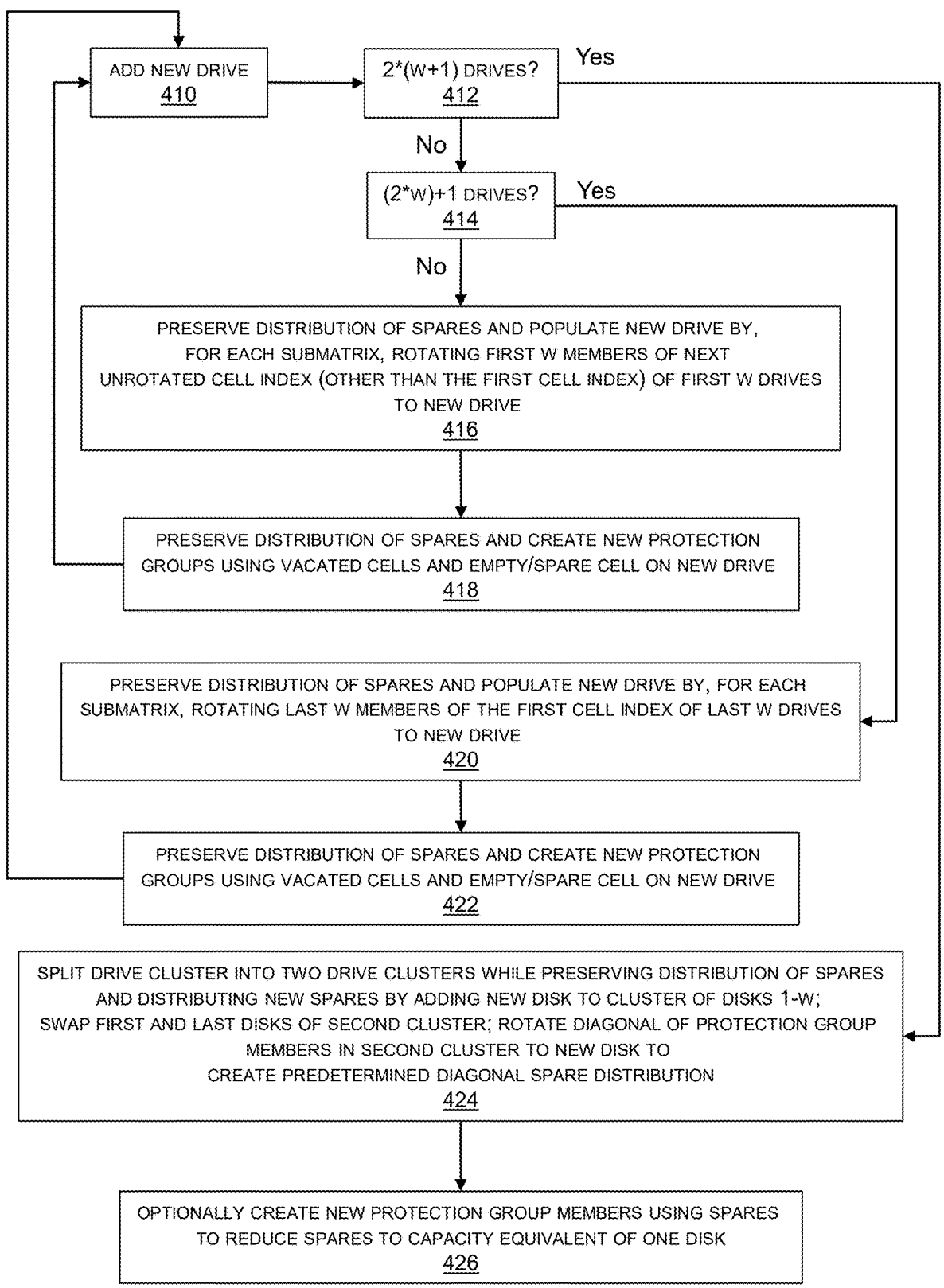
FIG. 14 illustrates a method for growing and splitting the drive cluster.

FIG. 14 illustrates a method for growing and splitting the drive cluster. A new drive is added to the cluster in step 410. It is assumed that the process begins with a minimal drive cluster. The new drive is assigned the next sequential drive number. Step 412 is determining whether the cluster now has 2*(W+1) drives, including the new drive. Step 414 is determining whether the cluster now has 2*W+1 drives. If the outcomes of steps 412 and 414 are both No, then step 416 is preserving the distribution of spare cells while populating the new drive by rotating the first W members of the lowest indexed unrotated cells, other than the first cell index of the first W drives of each submatrix, to the new drive. Step 418 is preserving the distribution of spare cells while creating new protection groups using cells vacated in step 416 and borrowing empty cells on the new drive. Steps 416 and 418 are iterated as new drives are added until the outcome of step 414 is Yes. When there are 2*W+1 drives, step 420 is preserving the distribution of spare cells while populating the new drive by rotating the last W members of the first cell index of the last W drives of each submatrix to the new drive. Step 422 is preserving the distribution of spare cells while creating new protection groups using cells vacated in step 420 and borrowing empty cells on the new drive. When there are 2(W+1) drives, step 424 is splitting the drive cluster into two drive clusters while preserving the distribution of spare cells and distributing new spares by adding the new disk to a first cluster of 1-W disks, swapping the first and last disks of a second cluster, and rotating a diagonal of protection group members in the second cluster to the new disk to create/preserve the original distribution of spare cells. Optional step 426 is creating new protection group members using spare cells to reduce the aggregate spare capacity of the two clusters to the equivalent of a single disk.

Figure 15:
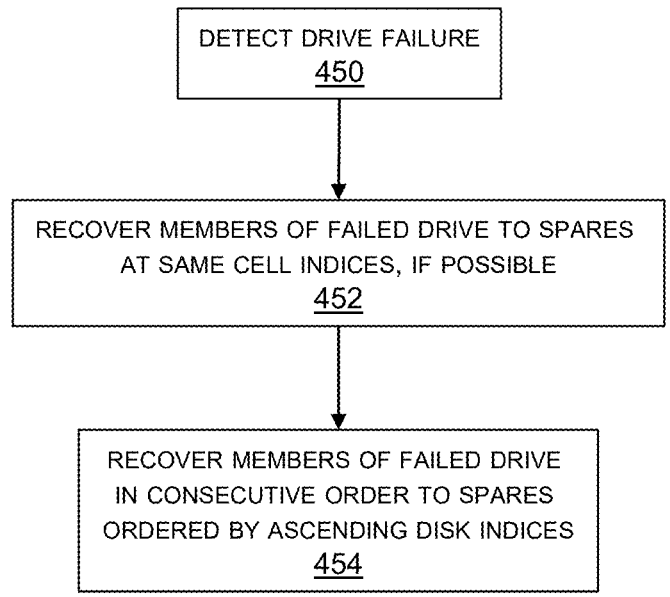
FIG. 15 illustrates a method for recovering from a drive failure.

FIG. 15 illustrates a method for recovering from a drive failure. The drive failure is detected in step 450. Step 452 is recovering the RAID members of the failed drive to spare cells at the same cell indices as the corresponding members of the failed drive, if possible. If that is not possible, then the members of the failed drive, in consecutive (e.g., alphabetical) member order are recovered to the spare cells in order by ascending disk indices.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
    creating, for a protection group width W, a cluster of W+1 sequentially indexed drives;
    creating at least 2*W same-size sequentially indexed cells in each of the sequentially indexed drives;
    creating submatrices of W cells;
    creating, in a first cell index of each of the submatrices, a protection group in sequentially indexed drives starting with a lowest indexed drive;
    in each submatrix, creating W spare cells and (W−1) additional protection groups distributed in cell-index-wise consecutive runs of a spare cell followed by sequentially ordered members of the additional protection groups; and
    widely distributing spare capacity by adding drives to the cluster, creating spare cells, splitting the cluster into first and second clusters, and distributing the spare cells across W drives in each of the first and second clusters.

2. The method of claim 1 further comprising adding a new drive to the cluster and preserving the distribution of spare cells while populating the new drive by rotating the first W members of a lowest unrotated cell index, other than the first cell index, of each submatrix.

3. The method of claim 2 further comprising preserving the distribution of spare cells while creating new protection groups using cells vacated by rotating the first W members of the lowest unrotated cell index and borrowing empty cells on the new drive.

4. The method of claim 1 further comprising, when there are 2*W+1 drives, preserving the distribution of spare cells while populating a new drive by rotating a last W members of the first cell index of a last W drives of each submatrix to the new drive.

5. The method of claim 4 further comprising creating new protection groups using cells vacated by rotating a last W members of the first cell index of a last W drives of each submatrix to the new drive and borrowing empty cells on the new drive.

6. The method of claim 1 further comprising, when there are 2(W+1) drives, splitting the cluster into first and second clusters while preserving the distribution of spare cells and distributing new spares by adding a new disk to the first cluster of 1-W of the drives, swapping first and last drives of the second cluster, and rotating a diagonal of protection group members in the second cluster to the new disk.

7. The method of claim 1 further comprising recovering members of a failed drive to spare cells at matching cell indices, if possible, and otherwise recovering the members in consecutive order to spare cells in order by ascending disk indices.

8. An apparatus, comprising:
    a plurality of drives;
    a plurality of interconnected compute nodes that manage access to the drives; and
    a drive manager configured to:
        create, for a protection group width W, a cluster of W+1 sequentially indexed drives;
        create at least 2*W same-size sequentially indexed cells in each of the sequentially indexed drives;
        create submatrices of W cells;
        create, in a first cell index of each of the submatrices, a protection group in ones of the sequentially indexed drives starting with a lowest indexed drive;
        in each submatrix, create W spare cells and (W−1) additional protection groups distributed in cell-index-wise consecutive runs of a spare cell followed by sequentially ordered members of the additional protection groups; and
        widely distribute spare capacity by adding drives to the cluster, creating spare cells, splitting the cluster into first and second clusters, and distributing the spare cells across W drives in each of the first and second clusters.

9. The apparatus of claim 8 further comprising the drive manager configured to add a new drive to the cluster and preserve the distribution of spare cells while populating the new drive by rotating the first W members of a lowest unrotated cell index, other than the first cell index, of each submatrix.

10. The apparatus of claim 9 further comprising the drive manager configured to preserve the distribution of spare cells while creating new protection groups using cells vacated by rotating the first W members of the lowest unrotated cell index and borrowing empty cells on the new drive.

11. The apparatus of claim 8 further comprising the drive manager configured to, when there are 2*W+1 drives, preserve the distribution of spare cells while populating a new drive by rotating a last W members of the first cell index of a last W drives of each submatrix to the new drive.

12. The apparatus of claim 11 further comprising the drive manager configured to create new protection groups using cells vacated by rotating a last W members of the first cell index of a last W drives of each submatrix to the new drive and borrowing empty cells on the new drive.

13. The apparatus of claim 8 further comprising the drive manager configured to, when there are 2(W+1) drives, split the cluster into first and second clusters while preserving the distribution of spare cells and distributing new spares by adding a new disk to the first cluster of 1-W of the drives, swapping first and last drives of the second cluster, and rotating a diagonal of protection group members in the second cluster to the new disk.

14. The apparatus of claim 8 further comprising the drive manager configured to recover members of a failed drive to spare cells at matching cell indices, if possible, and otherwise recover the members in consecutive order to spare cells in order by ascending disk indices.

15. A non-transitory computer-readable storage medium storing instructions that when executed by a computer cause the computer to perform a method for using a computer system to create and distribute spare capacity on a scalable drive subset on which protection groups are maintained, the method comprising:
creating, for a protection group width W, a cluster of W+1 sequentially indexed drives;
creating at least 2*W same-size sequentially indexed cells in each of the sequentially indexed drives;
creating submatrices of W cells;
creating, in a first cell index of each of the submatrices, a protection group in sequentially indexed drives starting with a lowest indexed drive;
in each submatrix, creating W spare cells and (W−1) additional protection groups distributed in cell-index-wise consecutive runs of a spare cell followed by sequentially ordered members of the additional protection groups; and
widely distributing spare capacity by adding drives to the cluster, creating spare cells, splitting the cluster into first and second clusters, and distributing the spare cells across W drives in each of the first and second clusters.

16. The non-transitory computer-readable storage medium of claim 15 in which the method further comprises adding a new drive to the cluster and preserving the distribution of spare cells while populating the new drive by rotating the first W members of a lowest unrotated cell index, other than the first cell index, of each submatrix.

17. The non-transitory computer-readable storage medium of claim 16 in which the method further comprises preserving the distribution of spare cells while creating new protection groups using cells vacated by rotating the first W members of the lowest unrotated cell index and borrowing empty cells on the new drive.

18. The non-transitory computer-readable storage medium of claim 15 in which the method further comprises, when there are 2*W+1 drives, preserving the distribution of spare cells while populating a new drive by rotating a last W members of the first cell index of a last W drives of each submatrix to the new drive.

19. The non-transitory computer-readable storage medium of claim 18 in which the method further comprises creating new protection groups using cells vacated by rotating a last W members of the first cell index of a last W drives of each submatrix to the new drive and borrowing empty cells on the new drive.

20. The non-transitory computer-readable storage medium of claim 15 in which the method further comprises, when there are 2(W+1) drives, splitting the cluster into first and second clusters while preserving the distribution of spare cells and distributing new spares by adding a new disk to the first cluster of 1-W of the drives, swapping first and last drives of the second cluster, and rotating a diagonal of protection group members in the second cluster to the new disk.

* * * * *